(12) United States Patent
Lin (10) Patent No.: US 11,516,836 B2
(45) Date of Patent: Nov. 29, 2022

(54) DOWNLINK CONTROL INFORMATION TRANSMISSION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 187 days.

(21) Appl. No.: 16/993,049

(22) Filed: Aug. 13, 2020

(65) Prior Publication Data

US 2020/0374916 A1    Nov. 26, 2020

Related U.S. Application Data

(63) Continuation of application No. PCT/CN2018/077071, filed on Feb. 23, 2018.

(51) Int. Cl.
    *H04W 72/12* (2009.01)
(52) U.S. Cl.
    CPC .................. *H04W 72/1289* (2013.01)
(58) Field of Classification Search
    CPC .................................. H04W 72/1289
    USPC ......................................... 370/329
    See application file for complete search history.

(56) References Cited

U.S. PATENT DOCUMENTS

| | | | |
|---|---|---|---|
| 2012/0320806 A1 | 12/2012 | Ji et al. | |
| 2013/0301560 A1 | 11/2013 | Geirhofer et al. | |
| 2016/0269969 A1 | 9/2016 | Braithwaite | |
| 2018/0042028 A1* | 2/2018 | Nam | H04B 7/0486 |
| 2019/0123801 A1* | 4/2019 | Yum | H04L 5/0064 |
| 2020/0322928 A1* | 10/2020 | Si | H04L 1/1896 |
| 2020/0358540 A1* | 11/2020 | Yokomakura | H04L 5/0094 |
| 2021/0168768 A1* | 6/2021 | Bae | H04W 72/042 |

FOREIGN PATENT DOCUMENTS

| | | |
|---|---|---|
| CN | 103516503 A | 1/2014 |
| CN | 104301065 A | 1/2015 |
| CN | 105515718 A | 4/2016 |
| CN | 106455103 A | 2/2017 |
| CN | 107113787 A | 8/2017 |
| CN | 107210899 A | 9/2017 |
| CN | 107318086 A | 11/2017 |
| EP | 3018851 A1 | 5/2016 |

(Continued)

OTHER PUBLICATIONS

First Office action issued in corresponding Canadian Application No. 3,091,981, dated Jul. 15, 2021, 5 pages.

(Continued)

*Primary Examiner* — Peter G Solinsky
(74) *Attorney, Agent, or Firm* — Bayes PLLC (57) ABSTRACT

Embodiments of the present application provide a downlink control information (DCI) transmission method, a terminal device, and a network device. The method includes receiving, by a terminal device, first DCI sent by a network device; and parsing, by the terminal device, the first DCI according to a DCI format of the first DCI and configuration information. The configuration information corresponds to the DCI format.

20 Claims, 3 Drawing Sheets

300

Send, by a network device, configuration information to a terminal device, wherein the configuration information corresponds to a DCI format — S310

Send, by the network device, a first DCI to the terminal device, so that the terminal device parses the first DCI according to the DCI format of the first DCI and the configuration information — S320

(56) References Cited

FOREIGN PATENT DOCUMENTS

| JP | 2016540408 | A  | 12/2016 |
|----|------------|----|---------|
| WO | 2014169091 | A1 | 10/2014 |
| WO | 2017222329 | A1 | 12/2017 |
| WO | 2019161549 | A1 | 8/2019  |

OTHER PUBLICATIONS

Notification to Grant Patent Right for Invention issued in corresponding Chinese Application No. 202011085416.X, dated Oct. 11, 2021, 7 pages.
First Office action issued in corresponding India Application No. 202027036738, dated Dec. 30, 2021, 6 pages.
Notice of Reasons for Refusal issued in corresponding Japanese Application No. 2020-544468, dated Jan. 4, 2022, 20 pages.
"Discussion on time domain resource allocation", Agenda Item: 6.1.3 3.1.2, Source: Fujitsu, 3GPP TSG RAN WG1 Meeting #90 R1-1712742, Prague, Czech Republic, Aug. 21-25, 2017, 4 pages.
"CSI and MCS design for LTE URLLC", Agenda Item: 6.2.7 3, Source: Huawei, HiSilicon, 3GPP TSG RAN WG1 Meeting #92 R1-1801869, Athens, Greece, Feb. 26 Mar. 2, 2018, 4 pages.
"Analysis of Compact DCI", Agenda Item: 7.2.2, Source: MediaTek Inc., 3GPP TSG RAN WG1 Meeting #92 R1-1801675, Athens, Greece, Feb. 26-Mar. 2, 2018, 3 pages.
"Compact DCI for URLLC", Agenda Item: 7.2.2, Source: Oppo, 3GPP TSG RAN WG1 Meeting #92 R1-1802119, Athens, Greece, Feb. 26-Mar. 2, 2018, 2 pages.
"Discussion on compact DCI format design", Agenda Item: 7.2.2, Source: LG Electronics, 3GPP TSG RAN WG1 Meeting #92 R1-1802226, Athens, Greece, Feb. 26-Mar. 2, 2018, 5 pages.
Xiang, Gao, "The Research of Resource Scheduling Algorithms and MAC Layer Implementation of Simulation Platform in TD-LTE System", Publisher: China Master's Theses Full-text Database, Nov. 15, 2013, 74 pages.
Xia, Ming et al., "Spectrum-Efficient Provisioning for Multi-Channel Elastic Optical Networking", OFC/NFOEC Technical Digest © 2013 OSA, 3 pages.
"Discussion on compact DCI for URLLC", Agenda Item: 7.2.2, Source: vivo, 3GPP TSG RAN WG1 Meeting #92 R1-1801548, Athens, Greece, Feb. 26-Mar. 2, 2018, 5 pages.
Extended European Search Report issued in corresponding European Application No. EP 18 90 7298, dated Nov. 6, 2020, 8 pages.

* cited by examiner

DOWNLINK CONTROL INFORMATION TRANSMISSION METHOD, TERMINAL DEVICE AND NETWORK DEVICE

CROSS-REFERENCE TO RELATED APPLICATIONS

The present application is a continuation of International Application No. PCT/CN2018/077071, filed on Feb. 23, 2018, which is hereby incorporated by reference in its entirety.

BACKGROUND

Embodiments of the present disclosure generally relate to communication technologies, and more particularly, to downlink control information transmission methods, a terminal device and a network device.

The Ultra-Reliable and Low Latency Communication (URLLC) service is introduced in the 5th-Generation New Radio (5G NR) communication system. The characteristic of the URLLC service is to achieve transmission with ultra-high reliability (for example, 99.999%) within extremely short time delay (for example, 1 ms). In order to achieve this goal, the URLLC service requires not only data transmission to be highly reliable, but also control information transmission to be highly reliable.

How to improve the transmission reliability of control information, especially Downlink Control Information (DCI), is an urgent problem to be solved.

SUMMARY

Embodiments of the present disclosure provide a downlink control information transmission method, a terminal device, and a network device, which can improve transmission reliability of DCI (for example, the DCI for scheduling the URLLC service).

According to a first aspect, an embodiment of the present disclosure provides a downlink control information transmission method, including receiving, by a terminal device, first DCI sent by a network device; and parsing, by the terminal device, the first DCI according to a DCI format of the first DCI and configuration information, wherein the configuration information corresponds to the DCI format.

According to an implementation of the first aspect, the configuration information includes at least one of time domain resource indication information, a Channel State Information (CSI) report set, a frequency domain resource indication type, or a frequency domain resource indication granularity.

According to an implementation of the first aspect, parsing, by the terminal device, the first DCI according to a DCI format of the first DCI and configuration information, includes parsing, by the terminal device, a time domain resource and/or a frequency domain resource and/or a CSI report of data transmission scheduled by the first DCI according to the DCI format of the first DCI and the configuration information.

According to an implementation of the first aspect, the DCI format includes a compact DCI format and/or a regular DCI format.

According to an implementation of the first aspect, the configuration information includes first time domain resource indication information and second time domain resource indication information, the first time domain resource indication information corresponds to a compact DCI format, and the second time domain resource indication information corresponds to a regular DCI format. Parsing, by the terminal device, the first DCI according to a DCI format of the first DCI and configuration information includes if the DCI format of the first DCI belongs to the compact DCI format, determining, by the terminal device, a time domain resource location of data transmission scheduled by the first DCI according to a value of a time domain resource indication field in the first DCI and the first time domain resource indication information; or if the DCI format of the first DCI belongs to the regular DCI format, determining, by the terminal device, the time domain resource location of the data transmission scheduled by the first DCI according to the value of the time domain resource indication field in the first DCI and the second time domain resource indication information.

According to an implementation of the first aspect, a time domain resource indicated by the first time domain resource indication information includes a subframe where the first DCI is located, or includes the subframe where the first DCI is located and a next subframe of the subframe where the first DCI is located; or an amount of time domain resource configurations indicated by the first time domain resource indication information is less than an amount of time domain resource configurations indicated by the second time domain resource indication information.

According to an implementation of the first aspect, the configuration information includes a first CSI report set and a second CSI report set, the first CSI report set corresponds to a compact DCI format, and the second CSI report set corresponds to a regular DCI format. Parsing, by the terminal device, the first DCI according to a DCI format of the first DCI and configuration information includes if the DCI format of the first DCI belongs to the compact DCI format, determining, by the terminal device, a CSI report of data transmission scheduled by the first DCI according to a value of a CSI report indication field in the first DCI and the first CSI report set; or if the DCI format of the first DCI belongs to the regular DCI format, determining, by the terminal device, the CSI report of data transmission scheduled by the first DCI according to the value of the CSI report indication field in the first DCI and the second CSI report set.

According to an implementation of the first aspect, the first CSI report set includes an aperiodic CSI report; or the first CSI report set includes a CSI report, an interval between a time moment when the CSI report is reported and a time moment when the first DCI is received being less than a first threshold; or an amount of CSI reports included in the second CSI report set is greater than an amount of CSI reports included in the first CSI report set; or the second CSI report set includes a semi-statically triggered periodic CSI report; or an amount of bits of trigger signaling of CSI reports included in the second CSI report set is greater than an amount of bits of trigger signaling of CSI reports included in the first CSI report set.

According to an implementation of the first aspect, the configuration information includes a first frequency domain resource indication granularity and a second frequency domain resource indication granularity, the first frequency domain resource indication granularity corresponds to the compact DCI format, and the second frequency domain resource indication granularity corresponds to the conventional DCI format. Parsing, by the terminal device, the first DCI according to a DCI format of the first DCI and configuration information includes if the DCI format of the first DCI belongs to the compact DCI format, determining, by the terminal device, a frequency domain resource of data transmission scheduled by the first DCI according to a value of a field in the first DCI and the first frequency domain resource indication granularity; or if the DCI format of the first DCI belongs to the regular DCI format, determining, by the terminal device, a frequency domain resource of data transmission scheduled by the first DCI according to the value of the field in the first DCI and the second frequency domain resource indication granularity.

According to an implementation of the first aspect, a frequency domain granularity indicated by the first frequency domain resource indication granularity is greater than a frequency domain granularity indicated by the second frequency domain resource indication granularity.

According to an implementation of the first aspect, the configuration information includes a first frequency domain resource indication type and a second frequency domain resource indication type, the second frequency domain resource indication type corresponds to a compact DCI format, and the first frequency domain resource indication type and the second frequency domain resource indication type correspond to the regular DCI format. Parsing, by the terminal device, the first DCI according to a DCI format of the first DCI and configuration information includes if the DCI format of the first DCI belongs to the compact DCI format, determining, by the terminal device, a frequency domain resource of data transmission scheduled by the first DCI according to a value of a field in the first DCI and the second frequency domain resource indication type; or if the DCI format of the first DCI belongs to the regular DCI format, determining, by the terminal device, the frequency domain resource of data transmission scheduled by the first DCI according to the value of the field in the first DCI and the first frequency domain indication type and/or the second frequency domain resource indication type.

According to an implementation of the first aspect, the first DCI is used to schedule a URLLC service.

According to an implementation of the first aspect, before the terminal device parses the first DCI according to the DCI format of the first DCI and the configuration information, the method further includes receiving, by the terminal device, the configuration information sent by the network device.

According to an implementation of the first aspect, receiving, by the terminal device, the configuration information sent by the network device, includes receiving, by the terminal device, the configuration information sent by the network device through higher layer signaling.

According to a second aspect, an embodiment of the present disclosure provides a downlink control information transmission method, including sending, by a network device, configuration information to a terminal device, wherein the configuration information corresponds to a Downlink Control Information (DCI) format; sending, by the network device, a first DCI to the terminal device, so that the terminal device parses the first DCI according to the DCI format of the first DCI and the configuration information.

According to an implementation of the second aspect, the configuration information includes at least one of time domain resource indication information, a Channel State Information (CSI) report set, a frequency domain resource indication type, or a frequency domain resource indication granularity.

According to an implementation of the second aspect, the DCI format includes a compact DCI format and/or a regular DCI format.

According to an implementation of the second aspect, the configuration information includes first time domain resource indication information and second time domain resource indication information, the first time domain resource indication information corresponds to a compact DCI format, and the second time domain resource indication information corresponds to a regular DCI format.

According to an implementation of the second aspect, a time domain resource indicated by the first time domain resource indication information includes a subframe where the first DCI is located, or includes the subframe where the first DCI is located and a next subframe of the subframe where the first DCI is located; or an amount of time domain resource configurations indicated by the second time domain resource indication information is less than an amount of time domain resource configurations indicated by the third time domain resource indication information.

According to an implementation of the second aspect, the configuration information includes a first CSI report set and a second CSI report set, the first CSI report set corresponds to a compact DCI format, and the second CSI report set corresponds to a regular DCI format.

According to an implementation of the second aspect, the first CSI report set includes an aperiodic CSI report; or the first CSI report set includes a CSI report, an interval between a time moment when the CSI report is reported and a time moment when the first DCI is received being less than a first threshold; or an amount of CSI reports included in the second CSI report set is greater than an amount of CSI reports included in the first CSI report set; or the second CSI report set includes a semi-statically triggered periodic CSI report; or an amount of bits of trigger signaling of CSI reports included in the second CSI report set is greater than an amount of bits of trigger signaling of CSI reports included in the first CSI report set.

According to an implementation of the second aspect, the configuration information includes a first frequency domain resource indication granularity and a second frequency domain resource indication granularity, the first frequency domain resource indication granularity corresponds to the compact DCI format, and the second frequency domain resource indication granularity corresponds to the conventional DCI format.

According to an implementation of the second aspect, a frequency domain granularity indicated by the first frequency domain resource indication granularity is greater than a frequency domain granularity indicated by the second frequency domain resource indication granularity.

According to an implementation of the second aspect, the configuration information includes a first frequency domain resource indication type and a second frequency domain resource indication type, the second frequency domain resource indication type corresponds to a compact DCI format, and the first frequency domain resource indication type and the second frequency domain resource indication type correspond to the regular DCI format.

According to an implementation of the second aspect, the first DCI is used to schedule an URLLC service.

According to an implementation of the second aspect, sending, by the network device, the configuration information to the terminal device includes sending, by the network device, the configuration information to the network device through higher layer signaling.

According to a third aspect, there is provided a terminal device configured to perform the methods according to the first aspect or any implementation of the first aspect. The terminal device may include functional modules configured to perform the methods according to the first aspect or any implementation of the first aspect.

According to a fourth aspect, there is provided a network device configured to perform the methods according to the second aspect or any implementation of the second aspect. The network device may include functional modules configured to perform the methods according to the second aspect or any implementation of the second aspect.

According to a fifth aspect, there is provided a terminal device including a processor, a memory, and a transceiver. The processor, the memory and the transceiver communicate with each other via internal connections to deliver control and/or date signals, to make the terminal device perform the methods according to the first aspect or any implementation of the first aspect.

According to a sixth aspect, there is provided a network device including a processor, a memory, and a transceiver. The processor, the memory and the transceiver communicate with each other via internal connections to deliver control and/or data signals, to make the network device perform the methods according to the second aspect or any implementation of the second aspect.

According to a seventh aspect, there is provided a computer-readable medium having computer programs stored thereon. The computer programs include instructions for performing the methods according to the above aspects or any implementation of the above aspects.

According to an eighth aspect, there is provided a computer program product including instructions. When the instructions are executed on a computer, the computer is caused to perform the methods according to the above aspects or any implementation of the above aspects.

In the embodiments of the present disclosure, the terminal device may parse the first DCI according to the DCI format of the first DCI and the configuration information corresponding to the DCI format, thereby optimizing the flexibility, effectiveness, and adaptability of time-frequency resources, reducing signaling overhead and improving DCI transmission reliability.

DETAILED DESCRIPTION

Technical solutions according to embodiments of the present disclosure will be described clearly and completely with reference to drawings.

The technical solutions according to embodiments of the present disclosure can be applied to various communication systems, such as Global System of Mobile Communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or 5G system, (also called New Radio, NR) system, etc.

The terminal device in embodiments of the present disclosure can also be called User Equipment (UE), access terminal, subscriber unit, user station, mobile station, mobile terminal, remote station, remote terminal, mobile device, user terminal, terminal, wireless communication device, user agent or user device. The access terminal can be a cellular phone, a cordless phone, a Session Initiation Protocol (SIP) phone, or a Wireless Local Loop (WLL) station, a Personal Digital Assistant (PDA) device, a handheld device with wireless communication capabilities, a computing device or other processing device connected to wireless modems, an in-vehicle device, a wearable device, or a terminal device in a 5G network or a terminal device in a future evolved Public Land Mobile Network (PLMN), and so on.

Embodiments of the present disclosure are described with reference to a network device. The network device may be a device for communicating with the terminal device. The network device may be an evolved base station in LTE (Evolutional Node B, eNB or eNodeB), or a wireless controller in the Cloud Radio Access Network (CRAN) scenario, or the network device can be a relay station, an access point, an in-vehicle device, a wearable device, or a next-generation evolution base station (next-generation evolutional NodeB, NG-eNB), or an access network device (for example, gNB) in 5G network, or an access network device in future evolved Public Land Mobile Network (PLMN), and so on, and embodiments of the present disclosure do not impose specific limitations on this.

Figure 1:
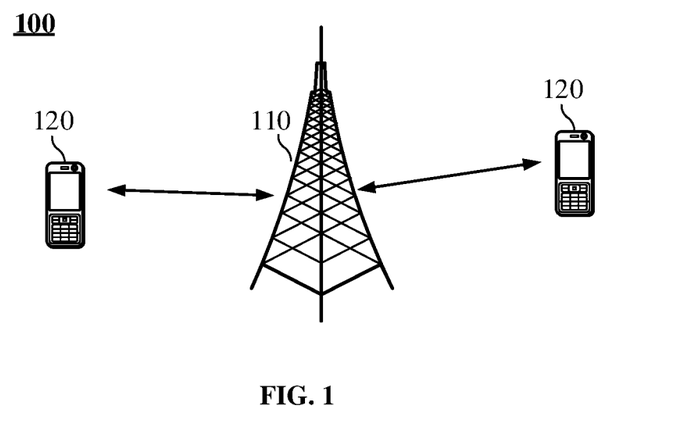
FIG. 1 is a schematic diagram of an application scenario according to an embodiment of the present disclosure.

According to embodiments, Device to Device (D2D) communication may be performed between terminal devices 120.

FIG. 1 exemplarily shows one network device 110 and two terminal devices 120. According to other embodiments, the wireless communication system 100 may include multiple network devices and any number of terminal devices may be included within the coverage of each network device, and embodiments of the present disclosure do not impose specific limitations on this.

According to embodiments, the wireless communication system 100 may further include an Access and Mobility Management Function (AMF), a Session Management Function (SMF), a Unified Data Management (UDM), an Authentication Server Function (AUSF), or other network entities, which are not limited in embodiments of the present disclosure.

In addition, various aspects or features of the present disclosure may be embodied as methods, devices, or articles of manufacture using standard programming and/or engineering techniques. The term "article of manufacture" as used herein encompasses a computer program accessible from any computer-readable device, carrier, or medium. For example, the computer-readable medium may include, but is not limited to: magnetic storage devices (for example, hard disks, floppy disks, or magnetic tapes, etc.), optical disks (for example, compact discs (CD), digital versatile discs (DVD), etc.), smart cards and flash memory devices (for example, Erasable Programmable Read-Only Memory (EPROM), cards, sticks or key drives, etc.). In addition, the various storage medium described herein may represent one or more devices and/or other machine-readable medium for storing information. The term "machine-readable medium" may include, but is not limited to, various medium capable of storing, containing, and/or carrying instructions and/or data.

It should be understood that the terms "system" and "network" are often used interchangeably herein. The term "and/or" used herein describes an association relationship between associated objects, which means that there can be three kinds of relationships, for example, A and/or B can mean: A exists alone, A and B exist at the same time, B exists alone. In addition, the character "/" generally indicates that the related objects are in an "or" relationship.

Figure 2:
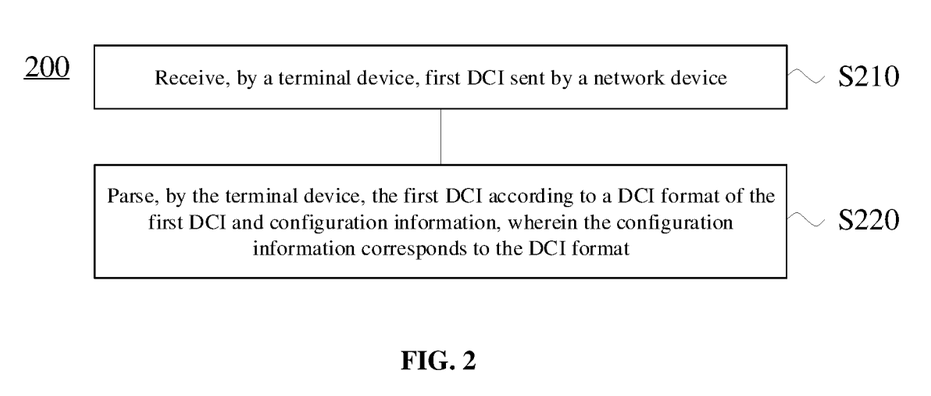
FIG. 2 is a schematic flowchart of a downlink control information transmission method according to an embodiment of the present disclosure.

FIG. 2 is a schematic flowchart of a downlink control information transmission method 200 according to an embodiment of the present disclosure. The method 200 can be applied to the system shown in FIG. 1, for example but is not limited thereto. The method 200 includes at least part of the following contents.

In S210, a terminal device receives a first DCI sent by a network device.

According to embodiments, the first DCI is used to schedule a URLLC service.

In S220, the terminal device parses the first DCI according to a DCI format of the first DCI and configuration information. The configuration information corresponds to the DCI format.

According to embodiments, the configuration information includes at least one of time domain resource indication information, a Channel State Information (CSI) report set, a frequency domain resource indication type, or a frequency domain resource indication granularity.

According to embodiments, the time domain resource indication information may be a time domain resource indication table.

According to embodiments, the terminal device parses the time domain resource and/or frequency domain resource and/or CSI report of the data transmission scheduled by the first DCI according to the DCI format of the first DCI and the configuration information.

According to embodiments, the DCI format includes a compact DCI format and/or a regular DCI format.

It should be understood that the DCI in the compact DCI format is mainly used for URLLC service scheduling, and the DCI occupies fewer bits; the DCI in the regular DCI format is mainly used for conventional or regular service scheduling (for example, Enhanced Mobile Broadband (eMBB) service), and the DCI occupies more bits, and the scheduling is more flexible.

In an implementation, if the configuration information includes time domain resource indication information, the terminal device may determine the time domain resource location of data transmission scheduled by the first DCI according to the configuration information and a value of a time domain resource indication field in the first DCI.

According to embodiments, the configuration information includes first time domain resource indication information and second time domain resource indication information. The first time domain resource indication information corresponds to the compact DCI format, and the second time domain resource indication information corresponds to the regular DCI format.

For example, the configuration information includes time domain resource indication information a and time domain resource indication information b, the time domain resource indication information a corresponds to the compact DCI format, and the time domain resource indication information b corresponds to the regular DCI format.

If the DCI format of the first DCI belongs to the compact DCI format, the terminal device determines the time domain resource location of data transmission scheduled by the first DCI according to a value of the time domain resource indication field in the first DCI and the time domain resource indication information a.

If the DCI format of the first DCI belongs to the regular DCI format, the terminal device determines the time domain resource location of the data transmission scheduled by the first DCI according to the value of the time domain resource indication field in the first DCI and the time domain resource indication information b.

According to embodiments, the time domain resource indicated by the first time domain resource indication information includes only the subframe where the first DCI is located, or includes only the subframe where the first DCI is located and a next subframe of the subframe where the first DCI is located; or the number of time domain resource configurations indicated by the first time domain resource indication information is less than the number of time domain resource configurations indicated by the second time domain resource indication information.

According to embodiments, the value of the time domain resource indication field in the DCI in the first time domain resource indication information and/or the second time domain resource indication information may correspond to the starting symbol, duration and data channel type (for example, Type A, Type B) of the time domain resource.

For example, the first time domain resource indication information may be shown in Table 1, and the second time domain resource indication information may be shown in Table 2.

TABLE 1

| Value of the time domain resource indication field in DCI | Starting symbol | Duration | Data channel type |
|---|---|---|---|
| 1 | 0 | 2 | Type B |
| 2 | 1 | 2 | Type B |
| 3 | 2 | 4 | Type B |

TABLE 2

| Value of the time domain resource indication field in DCI | Starting symbol | Duration | Data channel type |
|---|---|---|---|
| 1 | 0 | 7 | Type A |
| 2 | 14 | 7 | Type B |
| 3 | 21 | 14 | Type A |
| 4 | 28 | 14 | Type B |
| 5 | 35 | 14 | Type A |

According to the above embodiments, the time domain resource indication can be performed flexibly and effectively, to avoid redundant configuration (for example, cross-subframe scheduling, or scheduling with large granularity) in certain scenarios (such as URLLC scheduling), or to avoid that only a small amount of time domain resources are suitable for URLLC. Accordingly, the embodiments can reduce physical layer signaling overhead and improve signaling reliability.

In one implementation, if the configuration information includes a CSI report set, the terminal device may determine the CSI report of data transmission scheduled by the first DCI according to the configuration information and a value of a CSI report indication field in the first DCI.

According to embodiments, the configuration information includes a first CSI report set and a second CSI report set, the first CSI report set corresponds to the compact DCI format, and the second CSI report set corresponds to the regular DCI format.

For example, the configuration information includes a CSI report set a and a CSI report set b, the CSI report set a corresponds to the compact DCI format, and the CSI report set b corresponds to the regular DCI format.

If the DCI format of the first DCI belongs to the compact DCI format, the terminal device determines a CSI report of data transmission scheduled by the first DCI according to a value of a CSI report indication field in the first DCI and the CSI report set a.

If the DCI format of the first DCI belongs to the regular DCI format, the terminal device determines the CSI report of data transmission scheduled by the first DCI according to the value of the CSI report indication field in the first DCI and the CSI report set b.

According to embodiments, the first CSI report set includes an aperiodic CSI report; or the first CSI report set includes a CSI report, an interval between a time moment when the CSI report is reported and a time moment when the first DCI is received being less than a first threshold; or the number of CSI reports included in the second CSI report set is greater than the number of CSI reports included in the first CSI report set; or the second CSI report set includes a semi-statically triggered periodic CSI report; or the number of bits of trigger signaling of CSI reports included in the second CSI report set is greater than the number of bits of trigger signaling of CSI reports included in the first CSI report set.

According to embodiments, the value of the CSI report indication field in the first CSI report set and/or the second CSI report set may correspond to a CSI report.

According to embodiments, the CSI report may be aperiodic CSI (A-CSI) and periodic CSI (P-CSI). A CSI may include Rank Indication (RI) and Channel Quality Indicator (CQI).

For example, the first CSI report set may be as shown in Table 3. When the value of the CSI report indication field is 1, there are 2 symbols between receiving of the first DCI and reporting of A-CSI. When the value of the CSI report indication field is 2, the interval between receiving of the first DCI and reporting of the A-CSI is 4 symbols. The second CSI report set may be as shown in Table 4. When the value of the CSI report indication field is 1, the interval between receiving of the first DCI and reporting of A-CSI is 2 symbols. When the value of the CSI report indication field is 2, the interval between receiving of the first DCI and reporting of A-CSI is 14 symbols. When the value of the CSI report indication field is 3, the interval between receiving of the first DCI and reporting of A-CSI is 14 symbols. When the value of the CSI report indication field is 4, the interval between receiving of the first DCI and reporting of P-CSI is 2 symbols. When the value of the CSI report indication field is 5, the interval between receiving of the first DCI and reporting of P-CSI is 14 symbols.

TABLE 3

| Value of the CSI report indication field | CSI report |
| --- | --- |
| 1 | A-CSI(CQI) 2symbols |
| 2 | A-CSI(CQI) 4symbols |

TABLE 4

| Value of the CSI report indication field | CSI report |
| --- | --- |
| 1 | A-CSI(CQI) 2symbols |
| 2 | A-CSI(CQI) 14symbols |
| 3 | A-CSI(CQI, RI) 14symbols |
| 4 | P-CSI 2symbols |
| 5 | P-CSI 14symbols |

According to the above embodiments, the CSI report set can be optimized, thereby reducing signaling overhead.

In an implementation, if the configuration information includes frequency domain resource indication granularity, the terminal device may determine the frequency domain resource of the data transmission scheduled by the first DCI according to the configuration information and the value of the field of the first DCI.

According to embodiments, the configuration information includes a first frequency domain resource indication granularity and a second frequency domain resource indication granularity, the first frequency domain resource indication granularity corresponds to the compact DCI format, and the second frequency domain resource indication granularity corresponds to the regular DCI format.

For example, the configuration information includes a frequency domain resource indication granularity a and a frequency domain resource indication granularity b, the frequency domain resource indication granularity a corresponds to the compact DCI format, and the frequency domain resource indication granularity b corresponds to the regular DCI format.

If the DCI format of the first DCI belongs to the compact DCI format, the terminal device determines the frequency domain resource of data transmission scheduled by the first DCI according to a value of a field in the first DCI and the frequency domain resource indication granularity a.

If the DCI format of the first DCI belongs to the regular DCI format, the terminal device determines the frequency domain resource of data transmission scheduled by the first DCI according to the value of the field in the first DCI and the frequency domain resource indication granularity b.

According to embodiments, a frequency domain granularity indicated by the first frequency domain resource indication granularity is greater than a frequency domain granularity indicated by the second frequency domain resource indication granularity.

According to embodiments, the first frequency domain resource indication granularity and/or the second frequency domain resource indication granularity may be represented by a Resource Block Group (RBG) size. The RBG Size can be expressed by Band Width (BW), the unit of which is physical resource block (PRB).

For example, the first frequency domain resource indication granularity and the second frequency domain resource indication granularity may be as shown in Table 5. When the RBG size is 0-6, the first frequency domain resource granularity is 4, and the second frequency domain resource granularity is 2. When the RBG size is 6-20, the first frequency domain resource granularity is 8, and the second frequency domain resource granularity is 4. When the RBG Size is 20-50, the first frequency domain resource granularity is 16, and the second frequency domain resource granularity is 8. When the RBG size is 50-100, the first frequency domain resource granularity is 32, and the second frequency domain resource granularity is 16. When the RBG Size is 100-200, the first frequency domain resource granularity is 48, and the second frequency domain resource granularity is 24.

TABLE 5

| RBG Size (BW, unit: PRB) | First frequency domain resource granularity | Second frequency domain resource granularity |
| --- | --- | --- |
| 6 | 4 | 2 |
| 20 | 8 | 4 |
| 50 | 16 | 8 |
| 100 | 32 | 16 |
| 200 | 48 | 24 |

According to the above embodiments, the signaling overhead of the physical layer can be optimized (reduced), and the first DCI can be correctly parsed to obtain the frequency domain resource of the data transmission scheduled by the first DCI.

In an implementation, if the configuration information includes a frequency domain resource indication type, the terminal device may determine the frequency domain resource of the data transmission scheduled by the first DCI according to the configuration information and a value of a field in the first DCI.

According to embodiments, the configuration information includes a first frequency domain resource indication type and a second frequency domain resource indication type, the second frequency domain resource indication type corresponds to the compact DCI format, and the first frequency domain resource indication type and the second frequency domain resource indication type correspond to the regular DCI format.

For example, the configuration information includes frequency domain resource indication type 1 and frequency domain resource indication type 2, the frequency domain resource indication type 2 corresponds to the compact DCI format, and the frequency domain resource indication type 1 and the frequency domain resource indication type 2 correspond to the regular DCI format.

If the DCI format of the first DCI belongs to the compact DCI format, the terminal device determines the frequency domain resource of data transmission scheduled by the first DCI according to a value of a field in the first DCI and the frequency domain resource indication type b.

If the DCI format of the first DCI belongs to the regular DCI format, the terminal device determines the frequency domain resource of data transmission scheduled by the first DCI according to the value of the field in the first DCI and the frequency domain indication type 1 and/or the frequency domain resource indication type 2.

According to the above embodiments, the signaling overhead of the physical layer can be optimized (reduced), and the first DCI can be correctly parsed to obtain the frequency domain resource of the data transmission scheduled by the first DCI.

In an implementation, the DCI format includes at least one of a compact DCI format, a regular DCI format, and a fallback DCI format.

It should be understood that the DCI in the fallback DCI format is mainly used in the case where the link quality suddenly deteriorates or the transmission mode is switched, and the number of needed bits is relatively small.

According to embodiments, the fallback DCI format can be configured together with the regular DCI format. The DCI in the fallback DCI format is applicable to the above-mentioned configuration related to the time domain, frequency domain, and CSI report of the DCI in the regular DCI format.

According to other embodiments, the compact DCI format, the regular DCI format, and the fallback DCI format can be separately configured. For specific configuration methods, reference may be made to the related configuration of the compact DCI format and the regular DCI format. For brevity, repeated descriptions are omitted here.

According to embodiments, before the terminal device parses the first DCI according to the DCI format of the first DCI and configuration information, the method 200 further includes receiving, by the terminal device, the configuration information sent by the network device.

According to embodiments, the terminal device receives the configuration information sent by the network device through higher layer signaling.

For example, the terminal device receives the configuration information sent by the network device through Radio Resource Control (RRC) signaling.

In the embodiments of the present disclosure, the terminal device may parse the first DCI according to the DCI format of the first DCI and the configuration information corresponding to the DCI format, thereby optimizing the flexibility, effectiveness, and adaptability of time-frequency resources, reducing signaling overhead and improving DCI transmission reliability.

Figure 3:
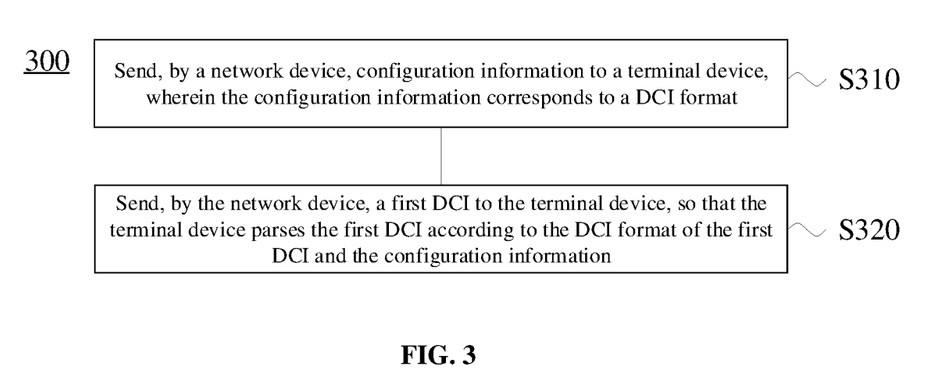
FIG. 3 is a schematic flowchart of a downlink control information transmission method according to an embodiment of the present disclosure.

FIG. 3 is a schematic flowchart of a downlink control information transmission method 300 according to an embodiment of the present disclosure. The method 300 can be applied to the system shown in FIG. 1, for example, but is not limited thereto. The method 300 includes at least part of the following contents.

In S310, a network device sends configuration information to a terminal device. The configuration information corresponds to a DCI format.

According to embodiments, the configuration information includes at least one of time domain resource indication information, a CSI report set, a frequency domain resource indication type, or a frequency domain resource indication granularity.

According to embodiments, the DCI format includes a compact DCI format and/or a regular DCI format.

In S320, the network device sends the first DCI to the terminal device, so that the terminal device parses the first DCI according to the DCI format of the first DCI and the configuration information.

According to embodiments, the configuration information includes first time domain resource indication information and second time domain resource indication information, the first time domain resource indication information corresponds to the compact DCI format, and the second time domain resource indication information corresponds to regular DCI format.

According to embodiments, the time domain resource indicated by the first time domain resource indication information includes the subframe where the first DCI is located, or, includes the subframe where the first DCI is located and a next subframe of the subframe where the first DCI is located; or the number of time domain resource configurations indicated by the second time domain resource indication information is less than the number of time domain resource configurations indicated by the third time domain resource indication information.

According to embodiments, the configuration information includes a first CSI report set and a second CSI report set, the first CSI report set corresponds to the compact DCI format, and the second CSI report set corresponds to the regular DCI format.

According to embodiments, the first CSI report set includes an aperiodic CSI report; or the first CSI report set includes a CSI report, an interval between a time moment when the CSI report is reported and a time moment when the first DCI is received being less than a first threshold; or the number of CSI reports included in the second CSI report set is greater than the number of CSI reports included in the first CSI report set; or the second CSI report set includes a semi-statically triggered periodic CSI report; or the number of bits of trigger signaling of CSI reports included in the second CSI report set is greater than the number of bits of trigger signaling of CSI reports included in the first CSI report set.

According to embodiments, the configuration information includes a first frequency domain resource indication granularity and a second frequency domain resource indication granularity, the first frequency domain resource indication granularity corresponds to the compact DCI format, and the second frequency domain resource indication granularity corresponds to the regular DCI format.

According to embodiments, a frequency domain granularity indicated by the first frequency domain resource indication granularity is greater than a frequency domain granularity indicated by the second frequency domain resource indication granularity.

According to embodiments, the configuration information includes a first frequency domain resource indication type and a second frequency domain resource indication type, the second frequency domain resource indication type corresponds to the compact DCI format, the first frequency domain resource type and the second frequency domain resource indication type correspond to the regular DCI format.

According to embodiments, the configuration information is semi-static configuration information.

According to embodiments, the first DCI is used to schedule a URLLC service.

According to embodiments, the network device sends the configuration information to the network device through higher layer signaling.

It should be understood that steps in the downlink control information transmission method 300 correspond to steps in the downlink control information transmission method 200, and detailed descriptions can be found from the descriptions regarding the previous embodiments and repeated descriptions are omitted.

Therefore, in embodiments of the present disclosure, the network device may configure configuration information including at least one of time domain resource indication information, a CSI report set, a frequency domain resource indication type, or a frequency domain resource indication granularity, so that the terminal device may parse the first DCI according to the DCI format of the first DCI and the configuration information corresponding to the DCI format. Accordingly, embodiments of the present disclosure can optimize the flexibility, effectiveness, and adaptability of time-frequency resources, reduce signaling overhead, and improve DCI transmission reliability.

Figure 4:
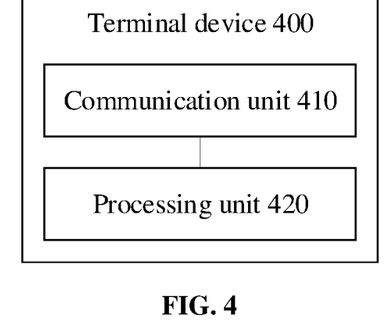
FIG. 4 is a schematic block diagram of a terminal device according to an embodiment of the present disclosure.

FIG. 4 is a schematic block diagram of a terminal device 400 according to an embodiment of the present disclosure. As shown in FIG. 4, the terminal device includes a communication unit 410 and a processing unit 420.

The communication unit 410 is configured to receive the first Downlink Control Information (DCI) sent by a network device.

The processing unit 420 is configured to parse the first DCI according to a DCI format of the first DCI and configuration information. The configuration information corresponds to the DCI format.

According to embodiments, the configuration information includes at least one of time domain resource indication information, a CSI report set, a frequency domain resource indication type, or a frequency domain resource indication granularity.

According to embodiments, the processing unit 420 is configured to parse a time domain resource and/or a frequency domain resource and/or a CSI report of data transmission scheduled by the first DCI according to the DCI format of the first DCI and the configuration information.

According to embodiments, the DCI format includes a compact DCI format and/or a regular DCI format.

According to embodiments, the configuration information includes first time domain resource indication information and second time domain resource indication information, the first time domain resource indication information corresponds to a compact DCI format, and the second time domain resource indication information corresponds to a regular DCI format.

The processing unit 420 is configured to if the DCI format of the first DCI belongs to the compact DCI format, determine a time domain resource location of data transmission scheduled by the first DCI according to a value of a time domain resource indication field in the first DCI and the first time domain resource indication information; or if the DCI format of the first DCI belongs to the regular DCI format, determine the time domain resource location of the data transmission scheduled by the first DCI according to the value of the time domain resource indication field in the first DCI and the second time domain resource indication information.

According to embodiments, a time domain resource indicated by the first time domain resource indication information includes a subframe where the first DCI is located, or includes the subframe where the first DCI is located and a next subframe of the subframe where the first DCI is located; or an amount of time domain resource configurations indicated by the first time domain resource indication information is less than an amount of time domain resource configurations indicated by the second time domain resource indication information.

According to embodiments, the configuration information includes a first CSI report set and a second CSI report set, the first CSI report set corresponds to a compact DCI format, and the second CSI report set corresponds to a regular DCI format.

The processing unit 420 is configured to if the DCI format of the first DCI belongs to the compact DCI format, determine, a CSI report of data transmission scheduled by the first DCI according to a value of a CSI report indication field in the first DCI and the first CSI report set; or if the DCI format of the first DCI belongs to the regular DCI format, determine the CSI report of data transmission scheduled by the first DCI according to the value of a time domain indication field in the first DCI and the second CSI report set.

According to embodiments, the first CSI report set includes an aperiodic CSI report; or the first CSI report set includes a CSI report, an interval between a time moment when the CSI report is reported and a time moment when the first DCI is received being less than a first threshold; or an amount of CSI reports included in the second CSI report set is greater than an amount of CSI reports included in the first CSI report set; or the second CSI report set includes a semi-statically triggered periodic CSI report; or an amount of bits of trigger signaling of CSI reports included in the second CSI report set is greater than an amount of bits of trigger signaling of CSI reports included in the first CSI report set.

According to embodiments, the configuration information includes a first frequency domain resource indication granularity and a second frequency domain resource indication granularity, the first frequency domain resource indication granularity corresponds to the compact DCI format, and the second frequency domain resource indication granularity corresponds to the conventional DCI format.

The processing unit 420 is configured to if the DCI format of the first DCI belongs to the compact DCI format, determine a frequency domain resource of data transmission scheduled by the first DCI according to a value of a field in the first DCI and the first frequency domain resource indication granularity; or if the DCI format of the first DCI belongs to the regular DCI format, determine a frequency domain resource of data transmission scheduled by the first DCI according to the value of the field in the first DCI and the second frequency domain resource indication granularity.

According to embodiments, a frequency domain granularity indicated by the first frequency domain resource indication granularity is greater than a frequency domain granularity indicated by the second frequency domain resource indication granularity.

According to embodiments, the configuration information includes a first frequency domain resource indication type and a second frequency domain resource indication type, the second frequency domain resource indication type corresponds to a compact DCI format, and the first frequency domain resource indication type and the second frequency domain resource indication type correspond to the regular DCI format.

The processing unit 420 is configured to if the DCI format of the first DCI belongs to the compact DCI format, determine a frequency domain resource of data transmission scheduled by the first DCI according to a value of a field in the first DCI and the second frequency domain resource indication type; or if the DCI format of the first DCI belongs to the regular DCI format, determine the frequency domain resource of data transmission scheduled by the first DCI according to the value of the field in the first DCI and the first frequency domain indication type and/or the second frequency domain resource indication type.

According to embodiments, the first DCI is used to schedule a URLLC service.

According to embodiments, before the processing unit 420 parses the first DCI according to the DCI format of the first DCI and the configuration information, the communication unit 410 is further configured to receive the configuration information sent by the network device.

According to embodiments, the communication unit 410 is configured to receive the configuration information sent by the network device through higher layer signaling.

It should be understood that the above and other operations and/or functions of each module in the terminal device 400 according to embodiments of the present disclosure are configured to implement the corresponding processes of the terminal device in the method 200 in FIG. 2, and for the sake of brevity, repeated descriptions are omitted here.

Figure 5:
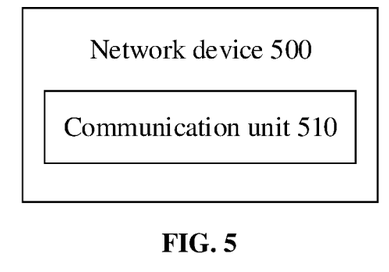
FIG. 5 is a schematic block diagram of a network device according to an embodiment of the present disclosure.

FIG. 5 is a schematic block diagram of a network device 500 according to an embodiment of the present disclosure. As shown in FIG. 5, the network device 500 includes a communication unit 510.

The communication unit 510 is configured to send configuration information to a terminal device. The configuration information corresponds to a DCI format.

The communication unit 510 is further configured to send a first DCI to the terminal device, so that the terminal device parses the first DCI according to the DCI format of the first DCI and the configuration information.

According to embodiments, the configuration information includes at least one of time domain resource indication information, a CSI report set, a frequency domain resource indication type, or a frequency domain resource indication granularity.

According to embodiments, the DCI format includes a compact DCI format and/or a regular DCI format.

According to embodiments, the configuration information includes first time domain resource indication information and second time domain resource indication information, the first time domain resource indication information corresponds to a compact DCI format, and the second time domain resource indication information corresponds to a regular DCI format.

According to embodiments, a time domain resource indicated by the first time domain resource indication information includes a subframe where the first DCI is located, or includes the subframe where the first DCI is located and a next subframe of the subframe where the first DCI is located; or an amount of time domain resource configurations indicated by the second time domain resource indication information is less than an amount of time domain resource configurations indicated by the third time domain resource indication information.

According to embodiments, the configuration information includes a first CSI report set and a second CSI report set, the first CSI report set corresponds to a compact DCI format, and the second CSI report set corresponds to a regular DCI format.

According to embodiments, the first CSI report set includes an aperiodic CSI report; or the first CSI report set includes a CSI report, an interval between a time moment when the CSI report is reported and a time moment when the first DCI is received being less than a first threshold; or an amount of CSI reports comprised in the second CSI report set is greater than an amount of CSI reports comprised in the first CSI report set; or the second CSI report set includes a semi-statically triggered periodic CSI report; or an amount of bits of trigger signaling of CSI reports comprised in the second CSI report set is greater than an amount of bits of trigger signaling of CSI reports comprised in the first CSI report set.

According to embodiments, the configuration information includes a first frequency domain resource indication granularity and a second frequency domain resource indication granularity, the first frequency domain resource indication granularity corresponds to the compact DCI format, and the second frequency domain resource indication granularity corresponds to the conventional DCI format.

According to embodiments, a frequency domain granularity indicated by the first frequency domain resource indication granularity is greater than a frequency domain granularity indicated by the second frequency domain resource indication granularity.

According to embodiments, the configuration information includes a first frequency domain resource indication type and a second frequency domain resource indication type, the second frequency domain resource indication type corresponds to a compact DCI format, and the first frequency domain resource indication type and the second frequency domain resource indication type correspond to the regular DCI format.

According to embodiments, the first DCI is used to schedule a URLLC service.

According to embodiments, the communication unit 510 is configured to send the configuration information to the network device through higher layer signaling.

It should be understood that the above and other operations and/or functions of each module in the network device 500 according to embodiments of the present disclosure are configured to implement the corresponding processes of the network device in the method 300 in FIG. 3, and for the sake of brevity, repeated descriptions are omitted here.

Figure 6:
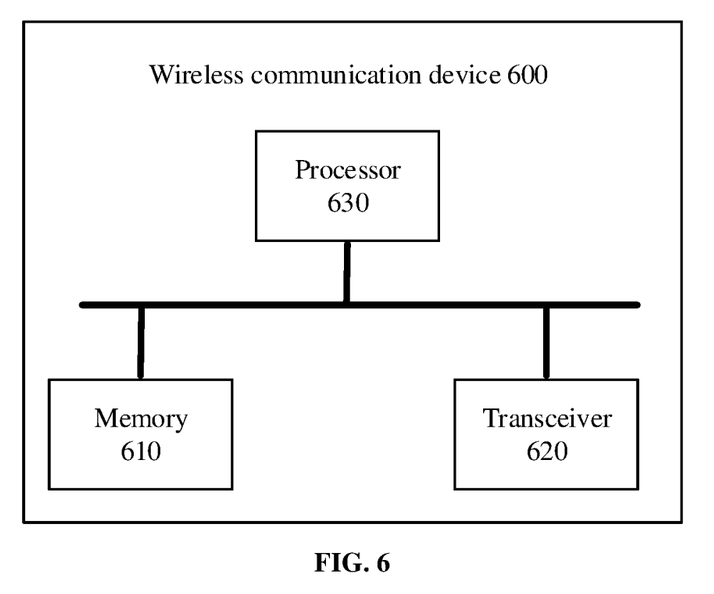
FIG. 6 shows a schematic block diagram of a wireless communication device according to an embodiment of the present disclosure.

FIG. 6 shows a schematic block diagram of a wireless communication device 600 according to an embodiment of the present disclosure. The device 600 includes a memory 610, a transceiver 620 and a processor 630.

The memory 610 is configured to store programs, and the programs include codes. The transceiver 620 is configured to communicate with other devices. The processor 630 is configured to execute the program codes in the memory 610.

According to embodiments, the transceiver 620 is configured to perform signal transmission and reception under the driving of the processor 630.

According to embodiments, when the codes are executed, the processor 630 may implement various operations performed by the terminal device in the method 200 in FIG. 2, and for the sake of brevity, details are not described herein again. For example, the device 600 may be a mobile phone.

According to embodiments, when the codes are executed, the processor 630 may implement various operations performed by the network device in the method 300 in FIG. 3, and for the sake of brevity, details are not described herein again. For example, the device 600 may be a network device (for example, a base station).

It should be understood that in embodiments of the present disclosure, the processor 630 may be a Central Processing Unit (CPU), and the processor 630 may also be other general-purpose processors, digital signal processors (DSPs), or application-specific integrated circuits (ASIC), field-programmable gate array (FPGA) or other programmable logic devices, discrete gates or transistor logic devices, discrete hardware components, etc. The general-purpose processor may be a microprocessor, or the processor may be any conventional processor or the like.

The memory 610 may include a read-only memory and a random access memory and provide instructions and data to the processor 630. A portion of the memory 610 may also include a non-volatile random-access memory. For example, the memory 610 may also store device type information.

The transceiver 620 may be used to implement signal transmission and reception functions, such as frequency modulation and demodulation functions or up-conversion and down-conversion functions.

In implementations, at least one step of the above methods may be completed by a hardware integrated logic circuit of in the processor 630, or the integrated logic circuit may be driven by instructions in the form of software to complete the at least one step. Therefore, the wireless communication device 600 may be a chip or a chipset. The steps of the methods according to embodiments of the present disclosure may be directly executed by a hardware processor or may be executed by a combination of hardware and software modules in the processor. The software module may be located in a mature storage medium in the art, such as a random-access memory, a flash memory, a read-only memory, a programmable read-only memory, an electrically erasable programmable memory, or a register. The storage medium resides in the memory, and the processor 630 reads the information in the memory and performs the steps of the above methods in combination with hardware. For clarity, repeated descriptions are omitted here.

Figure 7:
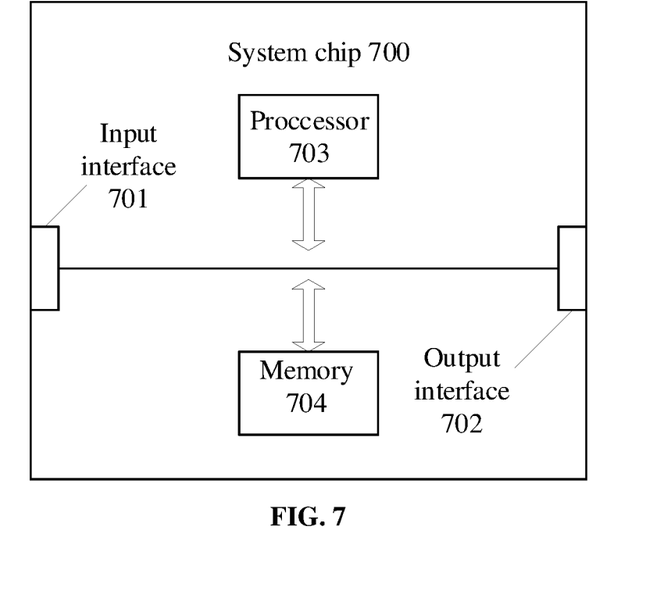
FIG. 7 is a schematic structural diagram of a system chip according to an embodiment of the present disclosure.

FIG. 7 is a schematic structural diagram of a system chip 700 according to an embodiment of the present disclosure. The system chip 700 of FIG. 7 includes an input interface 701, an output interface 702, a processor 703, and a memory 704. The input interface 701, the output interface 702, the processor 703, and the memory 704 can be connected by an internal communication connection line. The processor 703 is configured to execute codes in the memory 704.

According to embodiments, when the codes are executed, the processor 703 implements the methods performed by the terminal device in the method 200. For brevity, repeated descriptions are omitted here.

According to embodiments, when the codes are executed, the processor 703 implements the methods executed by the network device in the method 300. For brevity, repeated descriptions are omitted here.

The above embodiments can be implemented in whole or in part by software, hardware, firmware, or any combination thereof. When implemented by software, the embodiments can be implemented in whole or in part in the form of a computer program product. The computer program product includes one or more computer instructions. When the computer program instructions are loaded and executed on a computer, all or part of the processes or functions described in the embodiments of the present disclosure are generated. The computer may be a general-purpose computer, a dedicated computer, a computer network, or other programmable device. The computer instructions can be stored in a computer-readable storage medium, or transmitted from one computer-readable storage medium to another computer-readable storage medium, for example, the computer instructions can be transmitted from a website, a computer, a server or a data center to another website, another computer, another server or another data center in a wired manner (such as coaxial cable, optical fiber, digital subscriber line (DSL)) or in a wireless manner (such as infrared, wireless, microwave, etc.). The computer-readable storage medium may be any available medium that can be accessed by a computer or a data storage device like a server or a data center in which one or more available mediums are integrated. The available medium may be a magnetic medium (for example, a floppy disk, a hard disk, a magnetic tape), an optical medium (for example, a DVD), or a semiconductor medium (for example, Solid State Disk (SSD)).

It should be understood that in various embodiments of the present disclosure, the sequence numbers of the above processes do not mean the order of execution, and the execution order of the processes should be determined by their functions and inherent logic, and should not be construed as constituting any limitation on the present disclosure.

Those skilled in the art can clearly understand that the specific working processes of the systems, devices, and units can be found in the descriptions regarding the corresponding processes in the foregoing method embodiments, which will not be repeated here.

The foregoing descriptions are merely exemplary implementations of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defined by the appended claims.

What is claimed is:

1. A method for downlink control information transmission, comprising:
    receiving, by a terminal device, configuration information sent by a network device through higher layer signaling;
    receiving, by the terminal device, a first Downlink Control Information (DCI) sent by the network device; and
    parsing, by the terminal device, the first DCI according to a DCI format of the first DCI and the configuration information, wherein the configuration information corresponds to the DCI format;
    wherein parsing, by the terminal device, the first DCI according to the DCI format of the first DCI and the configuration information comprises:
    responsive to that the DCI format of the first DCI belongs to a compact DCI format, determining, by the terminal device, a frequency domain resource of data transmission scheduled by the first DCI according to a value of a field in the first DCI and a first frequency domain resource granularity which corresponds to a compact DCI format and is comprised in the configuration information; or
    responsive to that the DCI format of the first DCI belongs to a regular DCI format, determining, by the terminal device, a frequency domain resource of data transmission scheduled by the first DCI according to the value of the field in the first DCI and a second frequency domain resource granularity which corresponds to a regular DCI format;
    wherein a frequency domain granularity indicated by the first frequency domain resource granularity is greater than the second frequency domain resource granularity.

2. The method according to claim 1, wherein parsing, by the terminal device, the first DCI according to the DCI format of the first DCI and the configuration information, further comprises:
    parsing, by the terminal device, at least one of a time domain resource, or a CSI report of the data transmission scheduled by the first DCI according to the DCI format of the first DCI and the configuration information.

3. The method according to claim 1, wherein parsing, by the terminal device, the first DCI according to the DCI format of the first DCI and the configuration information further comprises:
    responsive to that the DCI format of the first DCI belongs to the compact DCI format, determining, by the terminal device, a time domain resource location of data transmission scheduled by the first DCI according to a value of a time domain resource indication field in the first DCI and first time domain resource indication information which corresponds to the compact DCI format and is comprised in the configuration information; or
    responsive to that the DCI format of the first DCI belongs to the regular DCI format, determining, by the terminal device, the time domain resource location of the data transmission scheduled by the first DCI according to the value of the time domain resource indication field in the first DCI and second time domain resource indication information which corresponds to the regular DCI format and is comprised in the configuration information.

4. The method according to claim 1, wherein parsing, by the terminal device, the first DCI according to the DCI format of the first DCI and the configuration information further comprises:
    responsive to that the DCI format of the first DCI belongs to the compact DCI format, determining, by the terminal device, a CSI report of data transmission scheduled by the first DCI according to a value of a CSI report indication field in the first DCI and a first CSI report set which corresponds to the compact DCI format and is comprised in the configuration information; or
    responsive to that the DCI format of the first DCI belongs to the regular DCI format, determining, by the terminal device, the CSI report of data transmission scheduled by the first DCI according to the value of the CSI report indication field in the first DCI and a second CSI report set which corresponds to the regular DCI format and is comprised in the configuration information.

5. The method according to claim 1, wherein the first DCI is used to schedule an Ultra-Reliable and Low Latency Communication (URLLC) service.

6. A terminal device, comprising:
    a processor;
    a memory storing instructions executable by the processor; and
    a transceiver;
    wherein the transceiver is configured to:
    receive configuration information sent by a network device through higher layer signaling; and
    receive a first Downlink Control Information (DCI) sent by the network device; and
    wherein the processor is configured to parse the first DCI according to a DCI format of the first DCI and the configuration information, wherein the configuration information corresponds to the DCI format;
    wherein the processor is configured to:
    responsive to that the DCI format of the first DCI belongs to a compact DCI format, determine a frequency domain resource of data transmission scheduled by the first DCI according to a value of a field in the first DCI and a first frequency domain resource granularity which corresponds to a compact DCI format and is comprised in the configuration information; or
    responsive to that the DCI format of the first DCI belongs to a regular DCI format, determine a frequency domain resource of data transmission scheduled by the first DCI according to the value of the field in the first DCI and a second frequency domain resource granularity which corresponds to a regular DCI format;
    wherein a frequency domain granularity indicated by the first frequency domain resource granularity is greater than the second frequency domain resource granularity.

7. The terminal device according to claim 6, wherein the processor is configured to parse at least one of a time domain resource, a frequency domain resource, or a CSI report of data transmission scheduled by the first DCI according to the DCI format of the first DCI and the configuration information.

8. The terminal device according to claim 6, wherein the processor is further configured to:
  responsive to that the DCI format of the first DCI belongs to the compact DCI format, determine a time domain resource location of data transmission scheduled by the first DCI according to a value of a time domain resource indication field in the first DCI and first time domain resource indication information which corresponds to the compact DCI format and is comprised in the configuration information; or
  responsive to that the DCI format of the first DCI belongs to the regular DCI format, determine the time domain resource location of the data transmission scheduled by the first DCI according to the value of the time domain resource indication field in the first DCI and second time domain resource indication information which corresponds to the regular DCI format and is comprised in the configuration information.

9. The terminal device according to claim 6, wherein the processor is further configured to:
  responsive to that the DCI format of the first DCI belongs to the compact DCI format, determine, a CSI report of data transmission scheduled by the first DCI according to a value of a CSI report indication field in the first DCI and a first CSI report set which corresponds to the compact DCI format and is comprised in the configuration information; or
  responsive to that the DCI format of the first DCI belongs to the regular DCI format, determine the CSI report of data transmission scheduled by the first DCI according to the value of the CSI report indication field in the first DCI and a second CSI report set which corresponds to the regular DCI format and is comprised in the configuration information.

10. The terminal device according to claim 6, wherein the first DCI is used to schedule an Ultra-Reliable and Low Latency Communication (URLLC) service.

11. A downlink control information transmission method, comprising:
  sending, by a network device, a configuration information to a terminal device through higher layer signaling; wherein the configuration information comprises a first frequency domain resource indication granularity which corresponds to a compact DCI format;
  sending, by the network device, a first Downlink Control Information (DCI) to the terminal device;
  responsive to that the DCI format of the first DCI belongs to the compact DCI format, a value of a field in the first DCI and a first frequency domain resource granularity indicated by the first frequency domain resource indication granularity are used by the terminal device to determine a frequency domain resource of data transmission scheduled by the first DCI; or
  responsive to that the DCI format of the first DCI belongs to the regular DCI format, a value of a field in the first DCI and a second frequency domain resource granularity are used by the terminal device to determine a frequency domain resource of data transmission scheduled by the first DCI;
  wherein the first frequency domain granularity is greater than the second frequency domain resource granularity.

12. The method according to claim 11, wherein the configuration information further comprises at least one of time domain resource indication information, a Channel State Information (CSI) report set, or a frequency domain resource indication type.

13. The method according to claim 12, wherein the time domain resource indication information comprises first time domain resource indication information and second time domain resource indication information, the first time domain resource indication information corresponds to the compact DCI format, and the second time domain resource indication information corresponds to the regular DCI format.

14. The method according to claim 12, wherein the CSI report set comprises a first CSI report set and a second CSI report set, the first CSI report set corresponds to the compact DCI format, and the second CSI report set corresponds to the regular DCI format.

15. The method according to claim 11, wherein the first DCI is used to schedule a Ultra-Reliable and Low Latency Communication (URLLC) service.

16. A network device, comprising:
  a processor;
  a memory storing instructions executable by the processor; and
  a transceiver;
  wherein the transceiver is configured to: send a configuration information to a terminal device through higher layer signaling; wherein the configuration information comprises a first frequency domain resource indication granularity which corresponds to a compact DCI format;
  wherein the transceiver is further configured to send a first Downlink Control Information (DCI) to the terminal device;
  wherein responsive to that the DCI format of the first DCI belongs to the compact DCI format, a value of a field in the first DCI and a first frequency domain resource granularity indicated by the first frequency domain resource indication granularity are used by the terminal device to determine a frequency domain resource of data transmission scheduled by the first DCI; or
  responsive to that the DCI format of the first DCI belongs to the regular DCI format, a value of a field in the first DCI and a second frequency domain resource granularity are used by the terminal device to determine a frequency domain resource of data transmission scheduled by the first DCI;
  wherein the first frequency domain granularity is greater than the second frequency domain resource granularity.

17. The network device according to claim 16, wherein the configuration information further comprises at least one of time domain resource indication information, a Channel State Information (CSI) report set, or a frequency domain resource indication type.

18. The network device according to claim 17, wherein the time domain resource indication information comprises first time domain resource indication information and second time domain resource indication information, the first time domain resource indication information corresponds to the compact DCI format, and the second time domain resource indication information corresponds to the regular DCI format.

19. The network device according to claim 17, wherein the CSI report set comprises a first CSI report set and a second CSI report set, the first CSI report set corresponds to the compact DCI format, and the second CSI report set corresponds to the regular DCI format.

20. The network device according to claim 16, wherein the first DCI is used to schedule a Ultra-Reliable and Low Latency Communication (URLLC) service.

* * * * *